United States Patent
Sakamoto et al.

(10) Patent No.: US 8,655,185 B2
(45) Date of Patent: Feb. 18, 2014

(54) OPTICAL NODE, OPTICAL NETWORK SYSTEM, AND METHOD FOR MEASURING POLARIZATION MODE DISPERSION

(75) Inventors: Takeshi Sakamoto, Kawasaki (JP); Katsumi Fukumitsu, Kawasaki (JP); Kosuke Komaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 275 days.

(21) Appl. No.: 13/004,532

(22) Filed: Jan. 11, 2011

(65) Prior Publication Data

US 2011/0229128 A1  Sep. 22, 2011

(30) Foreign Application Priority Data

Mar. 19, 2010  (JP) .................................. 2010-65282

(51) Int. Cl.
*H04B 10/00* (2013.01)

(52) U.S. Cl.
USPC .............................. 398/147; 398/31; 398/152

(58) Field of Classification Search
CPC ................................................ H04B 10/07951
USPC ............................... 398/31, 29, 177, 147, 152
See application file for complete search history.

(56) References Cited

U.S. PATENT DOCUMENTS

| | | | |
|---|---|---|---|
| 5,949,560 A | 9/1999 | Roberts et al. | |
| 7,174,107 B2 | 2/2007 | Boroditsky et al. | |
| 7,587,142 B1 | 9/2009 | Brodsky et al. | |
| 2002/0178417 A1* | 11/2002 | Jacob et al. | 714/752 |
| 2007/0019904 A1 | 1/2007 | Bulow | |
| 2009/0214202 A1* | 8/2009 | Akasaka et al. | 398/29 |
| 2011/0103791 A1* | 5/2011 | Umnov et al. | 398/1 |

FOREIGN PATENT DOCUMENTS

| | | |
|---|---|---|
| JP | 10-271066 A | 10/1998 |
| JP | 2005-304048 A | 10/2005 |
| JP | 2008-054176 | 3/2008 |
| JP | 2008-209188 A | 9/2008 |

OTHER PUBLICATIONS

F., N. H. et al., "Optical Performance Monitoring from FIR Filter Coefficients in Coherent Receivers", OFC/NFOEC 2008, Feb. 24, 2008, pp. 1-3.
Misha Boroditsky, et al., "Increasing mean DGD measurement accuracy using second order PMD statistics", Holey Fibers and Photonic Crystals/Polarization Mode Dispersion/Photonics Time/Frequency Measurement and Control, 2003 Digest of the LEOS Summer Topical Meetings, Jun. 14, 2003, pp. 35-36, IEEE, U.S.A.
Japanese Office Action mailed Sep. 10, 2013 for corresponding Japanese Application No. 2010-065282, with English-language translation.

* cited by examiner

*Primary Examiner* — Leslie Pascal
(74) *Attorney, Agent, or Firm* — Fujitsu Patent Center

(57) ABSTRACT

An optical node disposed along a transmission line that uses optical fiber. The optical node includes a first signal generator and a monitor. The first signal generator generates a first measurement signal for measuring polarization mode dispersion values and transmits the first measurement signal along the transmission line. The monitor detects a second measurement signal from the transmission line and measures polarization mode dispersion values by performing signal processing with respect to the second measurement signal.

16 Claims, 18 Drawing Sheets

OPTICAL NODE, OPTICAL NETWORK SYSTEM, AND METHOD FOR MEASURING POLARIZATION MODE DISPERSION

CROSS-REFERENCE TO RELATED APPLICATIONS

This application is based upon and claims the benefit of priority of the prior Japanese Patent Application No. 2010-65282, filed on Mar. 19, 2010, the entire contents of which are incorporated herein by reference.

FIELD

Embodiments discussed herein relate to an optical node, an optical network system, and a method for measuring polarization mode dispersion whereby the polarization mode dispersion produced along an optical fiber transmission line is measured.

BACKGROUND

Optical network systems are provided with a plurality of optical nodes along their transmission lines, such as add modules, drop modules, and amplifiers, enabling higher capacities and longer distances by transmitting wavelength division multiplexed light. In such wavelength division multiplexing (WDM) optical transmission systems, polarization mode dispersion (PMD) is produced from the differences in the transmission speeds for the two polarization modes of an optical signal propagated inside the optical fiber. This PMD then influences the transmission characteristics. The influence of these PMD characteristics becomes more apparent as the per-wavelength transmission speed rises. In ultra high speed transmission system operating at 40 Gbps and 100 Gbps, for example, PMD characteristics become a significant factor causing degradation of transmission characteristics, and cannot be ignored. PMD characteristics are dependent on the performance of the optical fiber laid down as transmission lines. Particularly, older optical fiber that was laid down in the past may include some optical fiber with extremely poor PMD characteristics, which may in some cases exert fatal influence on the transmission characteristics.

PMD characteristics also randomly change as a result of various factors, such as external environment temperatures, curvature in the optical fiber due to external pressure, and shock forces exerted on the optical fiber. The degree of change also varies considerably: from slow change over the course of a year caused by external temperatures, to a sudden difference in speed by several tens of kilohertz as a result of impact shock. Given such variation, it is not easy to ascertain where and to what degree such variation will occur along a transmission line. In this way, PMD characteristics lead to inflated equipment costs when there is variation in the transmission characteristics (particularly when there are degraded characteristics) of an optical transmission system that has been adapted for higher speeds or longer distances. This in turn increases expenditure for maintenance and administration after the network is put into operation. For this reason, the measurement and management of PMD in optical transmission systems is crucial and in demand.

PMD measurement may be conducted using commonly sold measuring instruments that make use of analog optical components, such as optical fiber gratings. Measuring methods also encompass a variety of different techniques (see, for example, Japanese Unexamined Patent Application Publication No. 2008-209188). Also, in recent years, research and development has been pursued in technology that compensates for PMD produced along a transmission line by means of digital signal processing executed at a receiver. A method has been proposed wherein the filter coefficients obtained in the process of such compensation algorithms are then used to compute the differential group delay (DGD) of the PMD from the transmitting end to the receiving end (see, for example, F. N. Hauske et al, "Optical Performance Monitoring from FIR Filter Coefficients in Coherent Receivers", OFC/NFOEC 2008, pp. 1-3, February 2008).

With measuring instruments of the related art, or when measuring PMD by using digital signal processing at a receiver as described above, problems like the following occur when maintaining and operating a network in actual practice. With methods that use measuring instruments, it is difficult to measure PMD without affecting signals that are in operation. As a result, measurements are taken during a limited period of time after laying down the optical fiber but before actual operation, which means that long-term variation during network operation cannot be confirmed. In this way, since PMD is measured only during a limited, short period of time, external factors such as environmental variations are left unaccounted for, and the measurements cannot be used as sufficient information for ascertaining network conditions. Moreover, equipment costs are high, which increases maintenance and operation expenses.

Meanwhile, with methods involving digital signal processing at a receiver, the aggregate PMD is measured along the entire line from the transmitting end to the receiving end. FIG. 18 is a network layout diagram illustrating the configuration of PMD measurement using a receiver of the related art. Along the transmission line 2000 there are disposed optical nodes 2001, which may be relays, optical add/drop multiplexers (OADMs), or similar components. Optical signals output from a plurality of transmitters 2010 are transmitted on a plurality of signal paths for each WDM wavelength, and received by receivers 2020 of compatible wavelength. In the example illustrated in FIG. 18, PMD may be measured along the signal paths a1, a2, and a3 at the receivers 2020a and 2020b, respectively. Herein, the signal path a1 is the signal path along which an optical signal of specified wavelength is transmitted from the transmitter 2010a and received at the receiver 2020a. The signal path a2 is the signal path along which an optical signal of specified wavelength is transmitted from the transmitter 2010b and received at the receiver 2020b. The signal path a3 is the signal path along which an optical signal of specified wavelength is transmitted from the transmitter 2010a and received at the receiver 2020b.

However, PMD measurement of the signal paths a1, a2, and a3 involves measurement of paths that all pass through a plurality of optical nodes 2001, and PMD measurement of the spans (i.e., transmission line segments) a11, a12, a13, a14, and a15 existing between the individual optical nodes 2001 is not possible. In this respect, the inability to measure PMD in terms of individual spans means that the spans with poor PMD characteristics cannot be identified. Furthermore, since measurements are taken using signal light itself, the PMD characteristics on wavelengths that do not exist in signal light cannot be measured. Moreover, the digital signal processing at the receivers 2020 may only be used to measure the differential group delay (DGD), and long-term PMD characteristics (i.e., the mean PMD) cannot be measured. As a result, the PMD characteristics of optical fiber cannot be accurately obtained.

PMD measurement according to the above related art has the following specific disadvantages, which greatly increase administrative and operating costs as a result.

1. Spans with poor PMD characteristics cannot be identified, and much time and effort is involved in identification work, such as blocking optical signals in operation to take measurements. Furthermore, PMD characteristics cannot be accurately ascertained before signal connections are made, which necessitates route switching and other fault handling techniques after signal connections have been made.
2. When switching the signal path line to a redundant line, the PMD characteristics of the switching line cannot be ascertained, and thus an error might occur after switching.
3. Since gradual variation in PMD characteristics with respect to environmental temperature changes or changes over time cannot be fully ascertained prior to operation, there is a possibility that errors due to environmental temperature changes may occur after the network is put into operation.

One object of the technology disclosed herein is to enable easy, per-span measurement of PMD characteristics at low cost, and without affecting optical signals in operation.

SUMMARY

According to an aspect of the invention, an optical node is disposed along a transmission line that uses optical fiber. The optical node includes a first signal generator and a monitor. The first signal generator generates a first measurement signal for measuring polarization mode dispersion values and transmits the first measurement signal along the transmission line. The monitor detects a second measurement signal from the transmission line and measures polarization mode dispersion values by performing signal processing with respect to the second measurement signal.

The object and advantages of the invention will be realized and attained via at least the elements, features, and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, preferred embodiments of the disclosed technology will be described in detail and with reference to the attached drawings. The disclosed technology may be provided with, for example, a signal generator and a monitor for a measurement signal whose PMD characteristics are measured at each optical node, thereby making it possible to measure the per-span PMD characteristics (i.e., DGD values). The signal generator is provided in at least one optical node, and may be configured such that PMD characteristics are measured on a per-span basis by the signal processing of the monitor. The measurement signal uses signal light whose wavelength is not being used in the primary signal or primary signal band, or alternatively, signal light that is outside the primary signal band. In addition, by collecting PMD characteristics from individual optical nodes, a network management system or similar apparatus may compute the change in PMD characteristics (i.e., mean PMD values) over a fixed period of time, and both network administration as well as signal path controls may be conducted.

Embodiment 1

Basic Overall Configuration of Network System (Optical Node Configuration)

Figure 1:
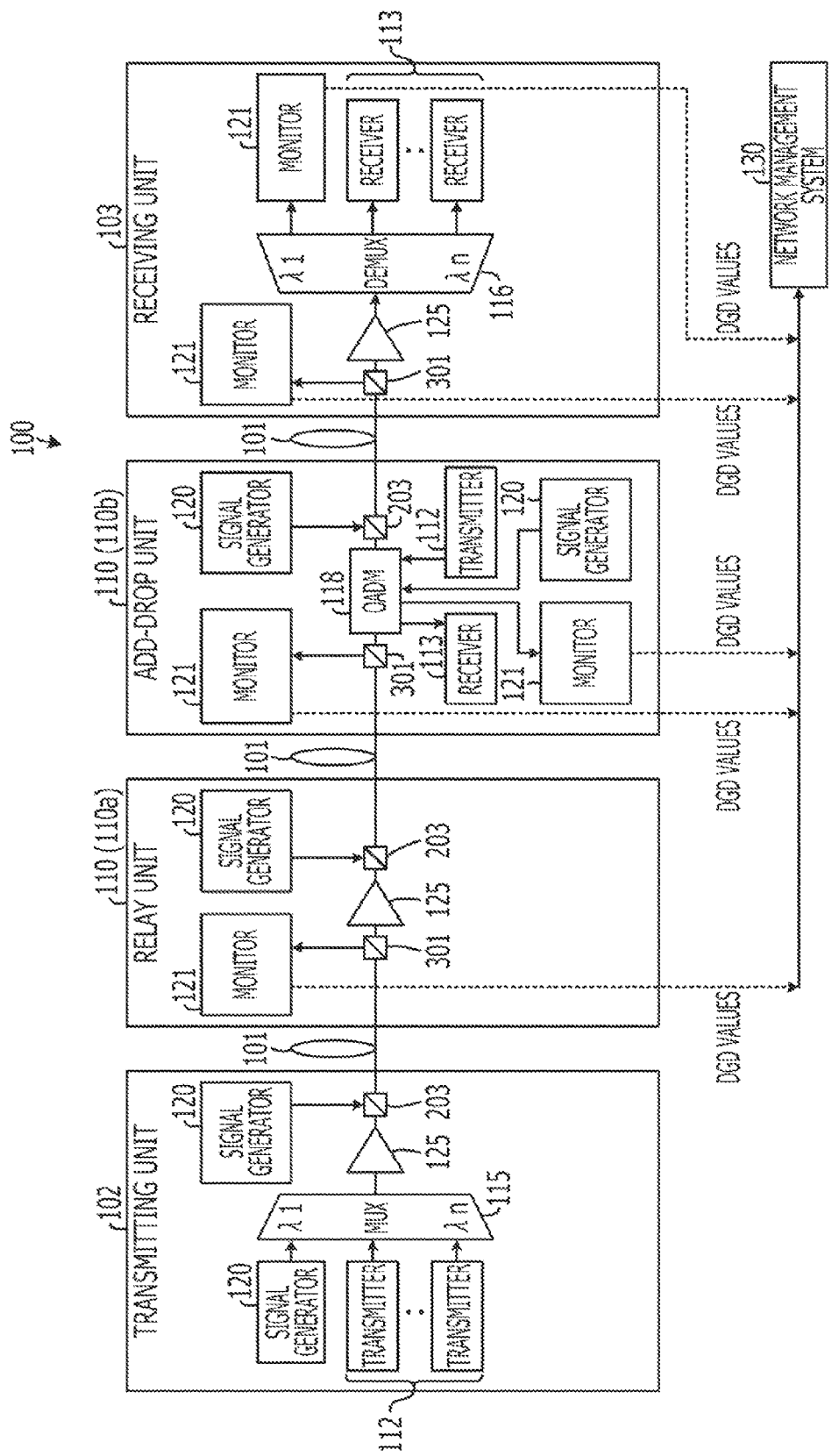
FIG. 1 is a block diagram of an optical network system provided with optical nodes in accordance with an embodiment.

FIG. 1 is a block diagram of an optical network system provided with optical nodes in accordance with an embodiment. In the optical network system 100, a plurality of optical nodes 110 are provided along a transmission line 101, with a transmitting unit 102 provided at the start terminal of the transmission line 101, and with a receiving unit 103 provided at the end terminal of the transmission line 101. The transmitting unit 102 is provided with transmitters 112 that transmit an optical signal (i.e., the primary signal) on multiple wavelengths that are used for network operation. The receiving unit 103 is provided with receivers 113 that receive the respective wavelengths of the primary signal. Each optical node 110 disposed along the transmission line 101 may be, for example, a relay unit 110a including an optical amplifier 125, or an add-drop unit 110b provided with an OADM 118 or similar module, as illustrated in FIG. 1. The add-drop unit 110b is provided with its own transmitter 112, which adds optical signals to the transmission line 101, as well as its own receiver 113, which receives optical signals dropped from other transmission lines. The add-drop unit 110b selects wavelengths according to optical signal paths along the transmission line 101. The transmitting unit 102, the relay unit 110a, and the receiving unit 103 are each provided with an optical amplifier 125.

In addition, a signal generator 120 is provided in the transmitting unit 102 and in each optical node 110, while a monitor 121 is provided in each optical node 110 and in the receiving unit 103. Along the transmission line 101, there are provided couplers 203, which combine the primary signal with a measurement signal generated by a signal generator 120, as well as splitters 301, which divert the measurement signal from the primary signal and into a monitor 121. The signal generator 120 provided in the transmitting unit 102 may also be disposed in-line with a transmitter 112 and configured to utilize the functions of the transmitter 112, producing a combined signal output via a multiplexer (MUX) 115. Similarly, the monitor 121 provided in the receiving unit 103 may be configured to utilize the functions of a receiver 113 downstream to a demultiplexer (DEMUX) 116. The data used for the measurement signal may be a particular specified pattern, a random pattern, or even indefinite data. The content of the data itself is arbitrary. However, the modulation/demodulation technique should be the same for the signal generator 120 and the monitor 121.

According to the above configuration, a measurement signal generated by a signal generator 120 in an upstream optical node 110 or transmitting unit 102 along the transmission line 101 is digitally processed by a downstream monitor 121, and the differential group delay (DGD values) for the PMD characteristics may be computed. These DGD values are then transmitted to a network management system (NMS) 130. The signal generator 120 may use a dedicated signal for measuring DGD values (i.e., a signal in a band that differs from the operating band of the network, such as an optical supervisory control (OSC) hereinafter described). Alternatively, the signal generator 120 may use a signal on a wavelength that is included in the operating band.

Figure 2:
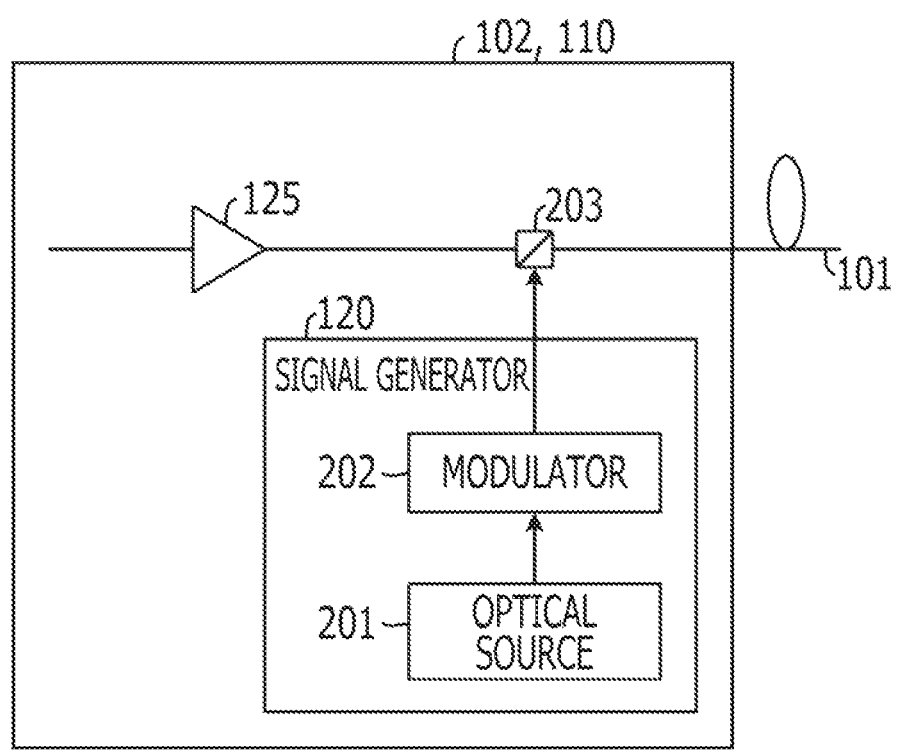
FIG. 2 is a block diagram illustrating one internal configuration of a signal generator.

FIG. 2 is a block diagram illustrating one internal configuration of a signal generator. The signal generator 120 generates a measurement signal for computing per-span DGD values. The signal generator 120 is provided in the transmitting unit 102, the relay unit 110a, and the add-drop unit 110b described above. In the signal generator 120, light output by an optical source 201 is modulated by a modulator 202, output by an output unit to the optical fiber of the transmission line 101 and combined with the primary signal by a coupler 203, and then transmitted downstream. A coupling filter or an optical coupler may be used for the coupler 203, which combines the measurement signal with the primary signal on the transmission line 101. The choice of the component used for the coupler 203, as well as the choice of wavelength for the optical source 201 will differ depending on the DGD measurement method. The modulation speed of the modulator 202 is not necessarily required to be equivalent to that of the primary signal on the transmission line 101. The optical amplifier 125 is not necessarily needed.

Figure 3:
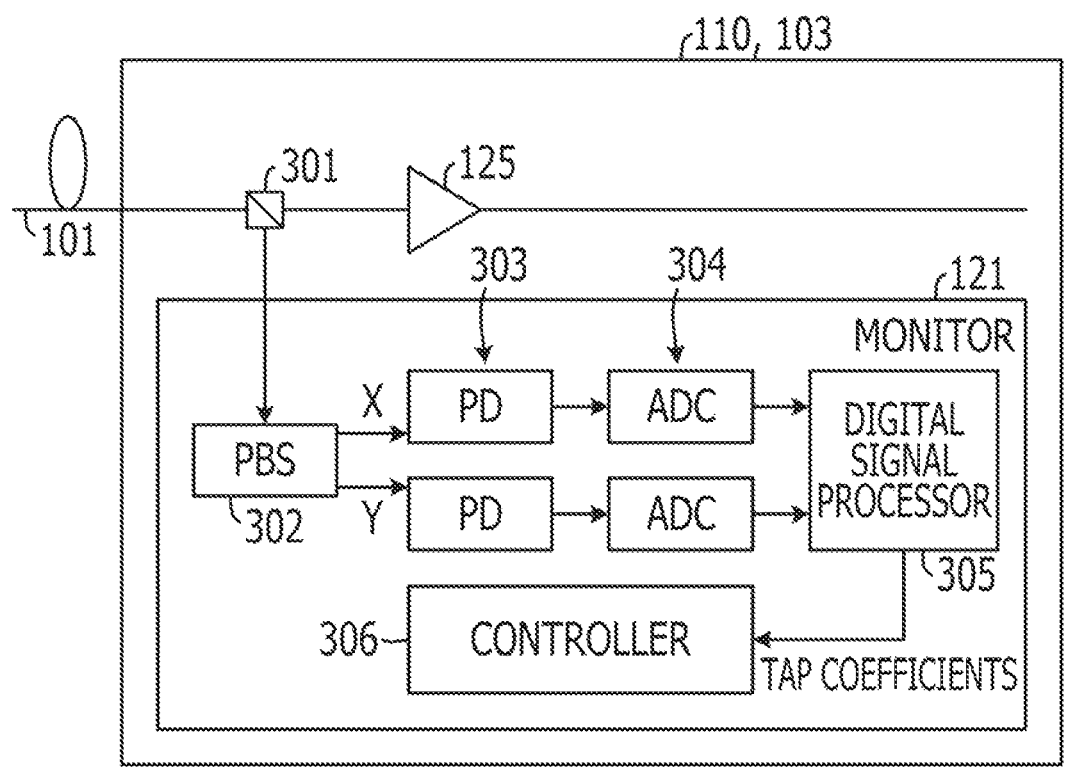
FIG. 3 is a block diagram illustrating one internal configuration of a monitor.

FIG. 3 is a block diagram illustrating one internal configuration of a monitor. The monitor 121 computes per-span DGD values on the basis of a measurement signal transmitted from a signal generator 120. The monitor 121 is provided in the relay unit 110a, the add-drop unit 110b, and the receiving unit 103. The splitter 301 provided along the transmission line 101 may be realized by means of an optical filter or an optical coupler. The splitter 301 separates the measurement signal from the primary signal and supplies the measurement signal to the monitor 121. The measurement signal is then split into mutually orthogonal X and Y components by a polarizing beam splitter (PBS) 302. Each component is opto-electrically converted by respective photodetectors (PDs) 303, digitally converted at respective analog-to-digital converters (ADCs) 304, and then output to a digital signal processor 305. The controller 306 accepts the input of FIR filter coefficients (i.e., tap coefficients) from the digital signal processor 305, performs arithmetic operations to compute the DGD, and then stores the obtained DGD values in a storage unit (not illustrated). (The arithmetic operations for computing the DGD will be described later.) The optical amplifier 125 is not necessarily needed.

Figure 4:
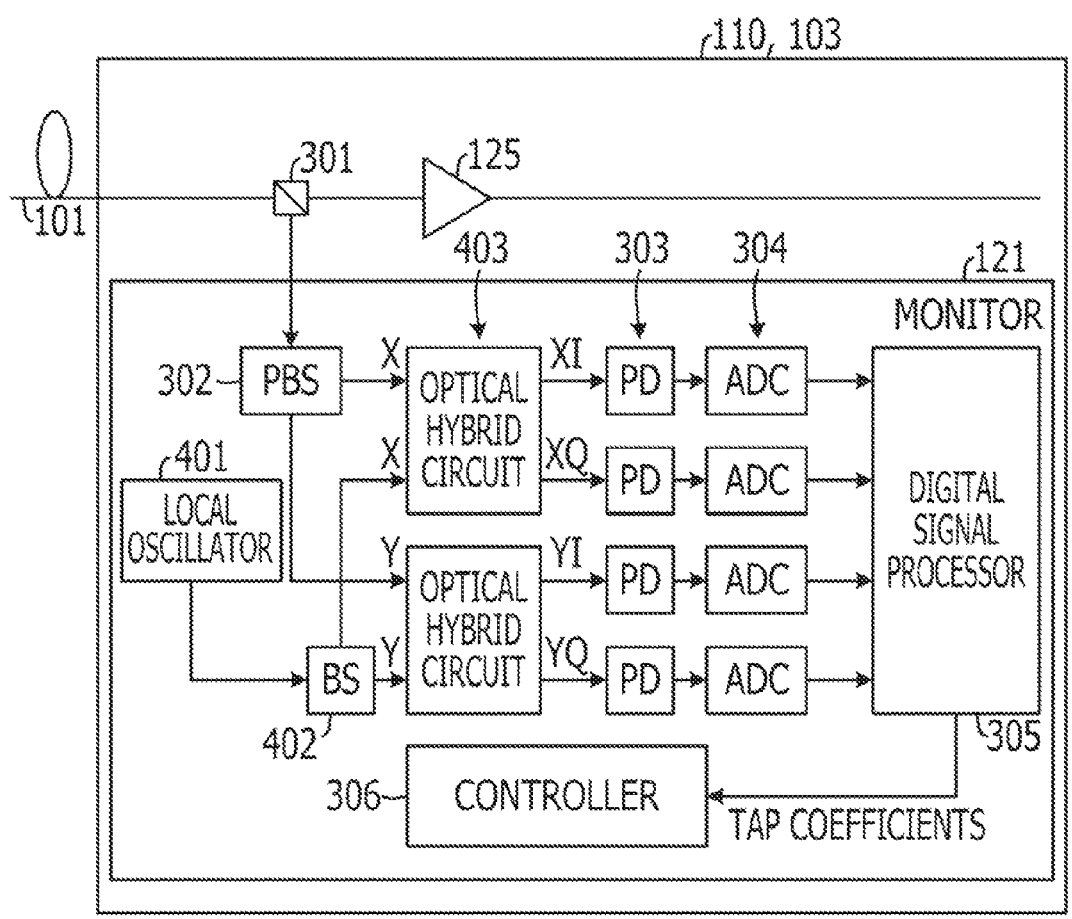
FIG. 4 is a block diagram illustrating another internal configuration of a monitor.

FIG. 4 is a block diagram illustrating another internal configuration of a monitor. In the configuration illustrated in FIG. 4, a measurement signal is transmitted from a signal generator 120 able to coherently receive 4QAM dual polarization quadrature phase shift keying (DP-QPSK) signal light, and per-span DGD values are then computed on the basis of this measurement signal. The monitor 121 is provided in the relay unit 110a, the add-drop unit 110b, and the receiving unit 103. The splitter 301 provided along the transmission line 101 may be realized by means of an optical filter or an optical coupler. The splitter 301 separates the measurement signal from the primary signal and supplies the measurement signal to the monitor 121.

The monitor 121 is provided with a PBS 302, PDs 303, ADCs 304, a digital signal processor 305, and a controller 306, similar to those in FIG. 3. In the configuration illustrated in FIG. 4, the monitor 121 is additionally provided with a local oscillator 401, a beam splitter (BS) 402, and optical hybrid circuits 403. A measurement signal for measuring DGD is separated from the primary signal by the splitter 301, split into mutually orthogonal X and Y components by the PBS 302, and then output to the optical hybrid circuits 403. The two orthogonal polarizations (i.e., the X-axis and Y-axis components) each include I (in-phase component) and Q (quadrature component) signals.

The local oscillator 401 outputs an optical signal on the same wavelength as the measurement signal. This optical signal is split into mutually orthogonal X and Y components by the BS 402, and output to the optical hybrid circuits 403. The optical hybrid circuits 403 are independently configured for the X and Y components, respectively. In the X component circuit, the measurement signal and the optical signal from the local oscillator are mixed, with an in-phase component XI and a quadrature component XQ being output. In the Y component circuit, an in-phase component YI and a quadrature component YQ are output. The four outputs from the optical hybrid circuits 403 are opto-electrically converted by respective PDs 303, digitally converted at respective analog-to-digital converters (ADCs) 304, and then sent to the digital signal processor 305. The optical amplifier 125 is not necessarily needed.

Figure 5:
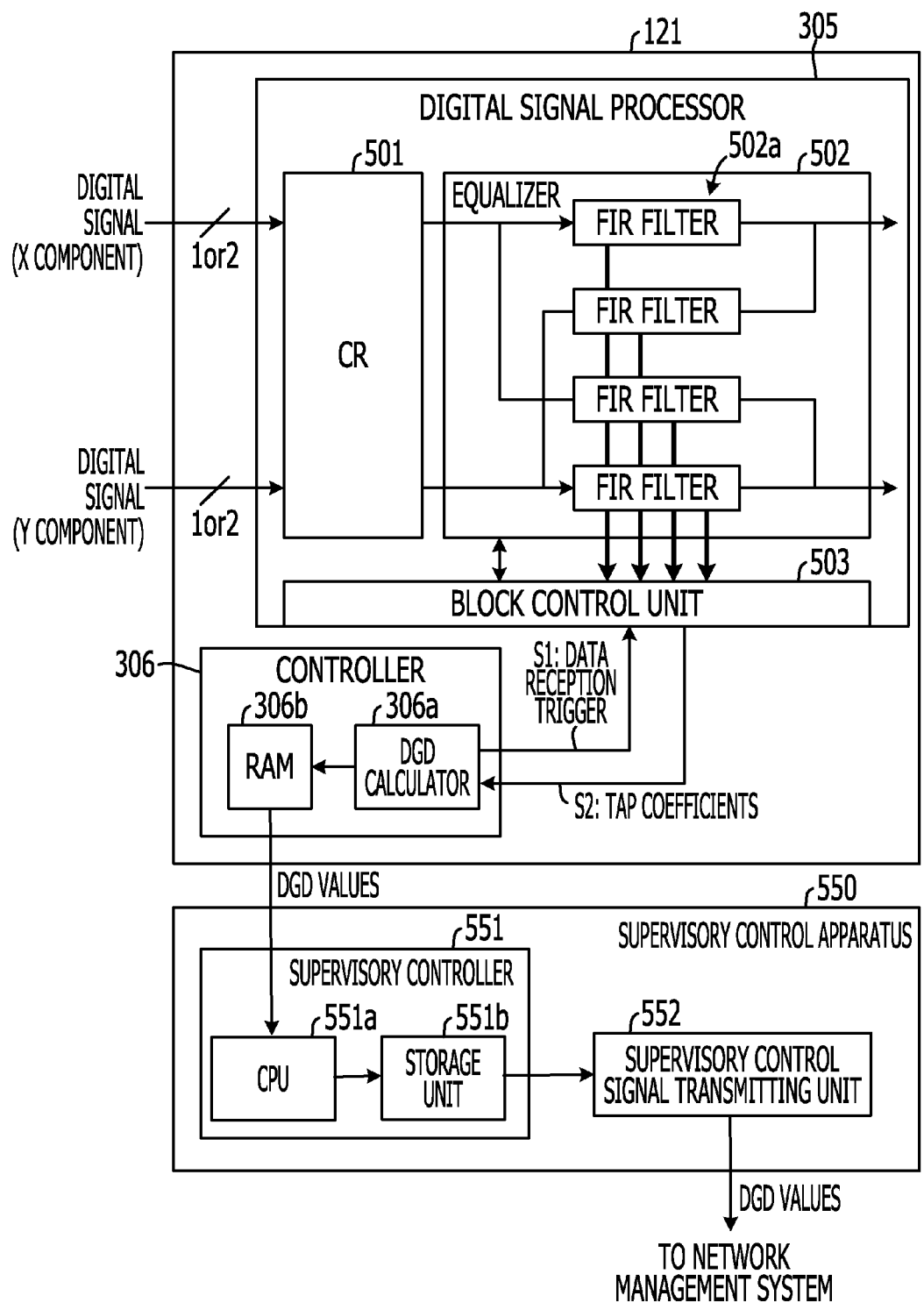
FIG. 5 is a block diagram illustrating one internal configuration of a digital signal processor.

FIG. 5 is a block diagram illustrating one internal configuration of a digital signal processor. The respective digital signals for the X and Y components (further separated into I and Q components in the case of DP-QPSK) are input into the digital signal processor 305, phase-aligned by a clock recovery (CR) unit 501, and then input into an equalizer 502. In the equalizer 502, the respective X and Y component signals are each split into two parts, and passed through a total of four FIR filters 502a.

The controller 306 uses the coefficients of the FIR filters 502a (i.e., the tap coefficients) to calculate the DGD values. For example, the controller 306 may periodically (once per second, for example) output a trigger (i.e., a data reception trigger) S1 to a block control unit 503 in the digital signal processor 305. The block control unit 503 controls interactions among the respective function blocks of the digital signal processor 305. Upon receiving a data reception trigger S1, the block control unit 503 latches the tap coefficients of the respective FIR filters 502a, and outputs the latched tap coefficients to the controller 306. In the controller 306, DGD values are computed from the tap coefficients by the DGD calculator 306a, and then stored in RAM 306b, a storage unit.

The DGD values stored in the RAM 306b are transmitted to a supervisory control apparatus 550 in response to a request from the supervisory control apparatus 550. The supervisory controller 551 of the supervisory control apparatus 550 is realized by a CPU 551a or similar processing devices provided in each optical node 110 and the receiving unit 103. The supervisory controller 551 includes a storage unit 551b that is configured to store a history of received DGD values. In so doing, the supervisory controller 551 is able to utilize the history of DGD values stored in the storage unit 551b to obtain the variation in DGD values over a given period of time, and compute mean PMD values. Additionally, it is possible to transmit these DGD values, mean PMD values, and other information to a network management system (NMS) via a supervisory control signal transmitting unit 552. For example, the supervisory control signal transmitting unit 552 may load DGD values onto an optical supervisory channel (OSC) signal, and then transmit the OSC signal to the NMS.

(NMS Configuration and Processing Details)

Figure 6:
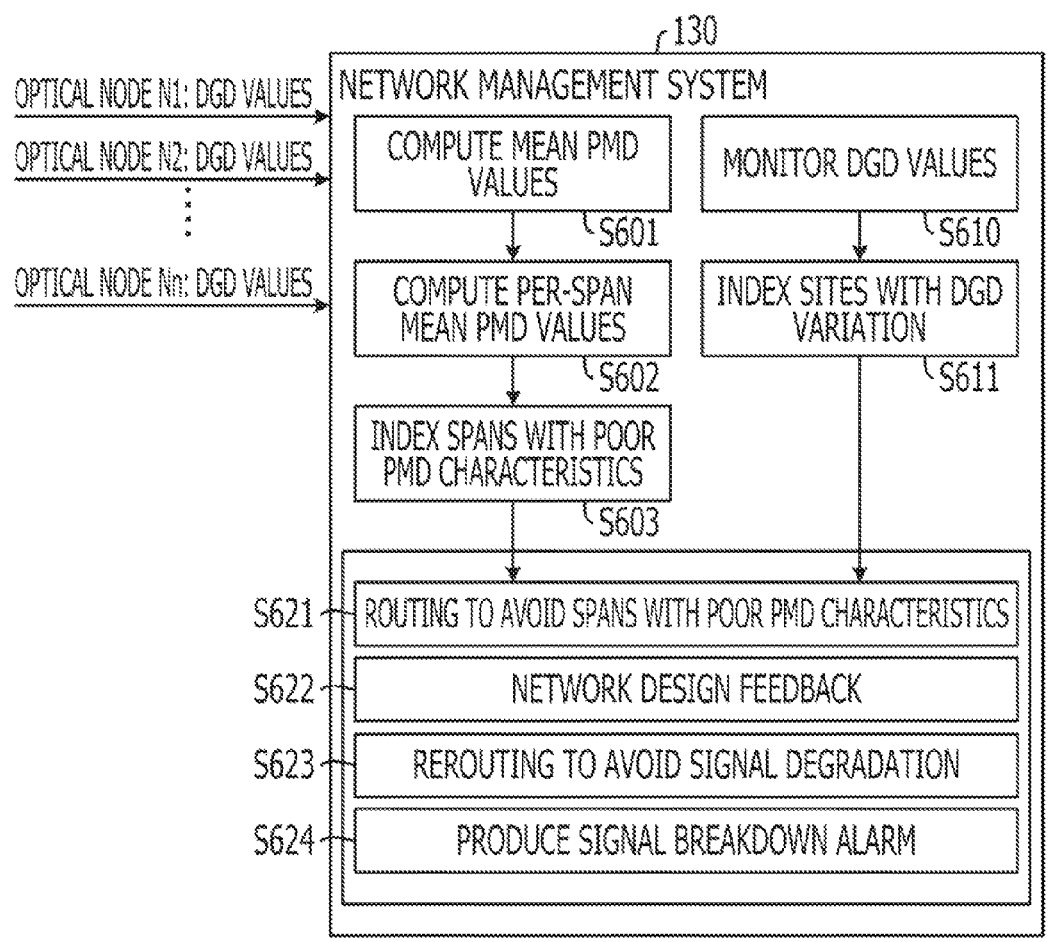
FIG. 6 illustrates one example of controls executed by a network management system.

FIG. 6 illustrates one example of controls executed by a network management system. The network management system (NMS) 130 collects DGD values from a plurality of optical nodes (N1 to Nn). The term "optical nodes" as used with respect to the DGD values, includes, for example, the relay unit 110a, the add-drop unit 110b, and the receiving unit 103. The NMS 130 then computes mean PMD values using the DGD values collected from the respective optical nodes. It has been established that DGD values are dispersed according to the Maxwell probability distribution, and thus the NMS 130 computes mean PMD values according to the distribution of DGD values collected from respective optical nodes (operation S601). The NMS 130 is also able to utilize the mean PMD values to compute per-span mean PMD values (operation S602), and index the spans with poor PMD characteristics (operation S603). Furthermore, the NMS 130 monitors the DGD values collected from respective optical nodes (operation S610), and indexes sites of large variation (operation S611).

The NMS 130 manages network operation on the basis of the above computational results. The basic functions of the NMS 130 involve monitoring optical signal routing on a per-wavelength basis, and line-switching to redundant systems when optical communication is abnormal. According to the above configuration, DGD values may be obtained from respective optical nodes, thereby enabling more granular network management. To give several examples of such monitoring and management operations, when adding a transmitter 112 for a new, specified wavelength (i.e., when adding wavelengths), signals are routed to avoid spans with poor PMD characteristics or DGD values (operation S621). When designing a network, actual PMD data is given to the design apparatus as feedback (operation S622). Signal routing is also conducted in order to avoid paths where severe signal degradation, errors, or cutoffs are anticipated (operation S623). Additionally, a signal breakdown alarm is produced for spans with poor PMD characteristics or DGD values, thereby alerting maintenance personnel (operation S624).

Also, the NMS 130 keeps track of the hour, day, and month by means of a timer, calculates mean DGD values for each of these time units, and stores the results in a storage unit (not illustrated). The NMS 130 then computes mean PMD values by utilizing the distribution of the mean DGD values stored in the storage unit. In so doing, it becomes possible to issue notifications regarding hazardous spans with poor PMD characteristics due to environmental temperatures or aging, and avoid such spans during route creation or signal routing.

Embodiment 2

Exemplary DGD Measurement Without Using a Primary Signal

Figure 7:
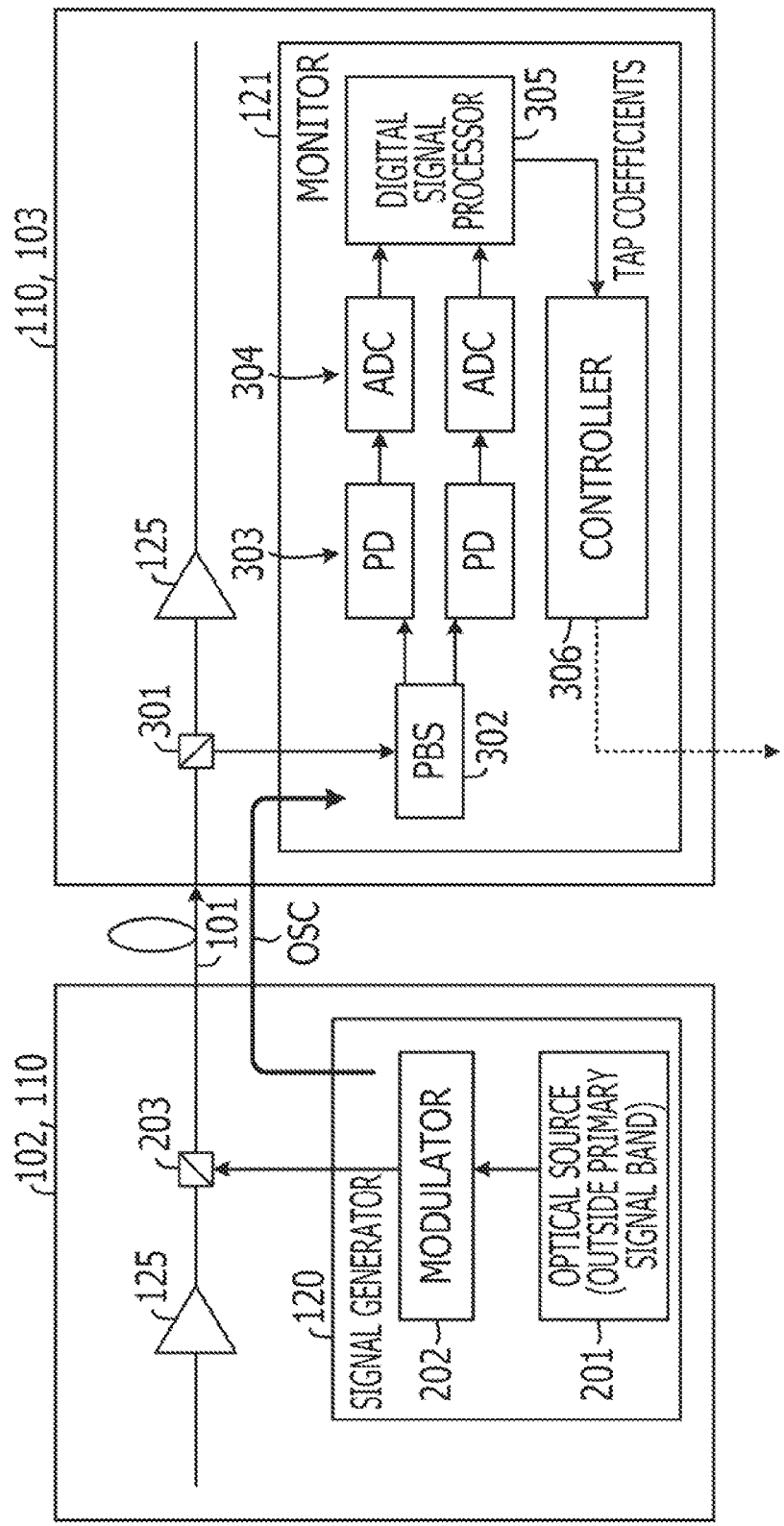
FIG. 7 is a block diagram representing a configuration that measures DGD by using wavelengths outside a primary signal band.

FIG. 7 is a block diagram representing a configuration that measures the DGD by using wavelengths outside a primary signal band. In this case, wavelengths outside the primary signal band are used to measure the DGD. For example, in the case of using optical supervisory control (OSC) light as the wavelengths outside the primary signal band, the optical source 201 outputs an optical signal on the wavelength of OSC light. The coupler 203 combines the OSC light with the primary signal on the transmission line 101, and the splitter 301 separates the OSC light from the primary signal. In so doing, OSC light may be used to obtain DGD values, without using a signal dedicated to measurement. The configuration illustrated in FIG. 7 is able to measure the DGD regardless of whether the primary signal is operational or non-operational, and may even measure the DGD in the case where there are no operating wavelengths in the primary signal. For example, the DGD may also be measured by using only OSC light among the optical nodes, before primary signal connections are made.

Embodiment 3

DGD Measurement Using Signals in the Primary Signal Band (Exemplary Configuration 1 of a Signal Generator for DGD Measurement)

Figure 8:
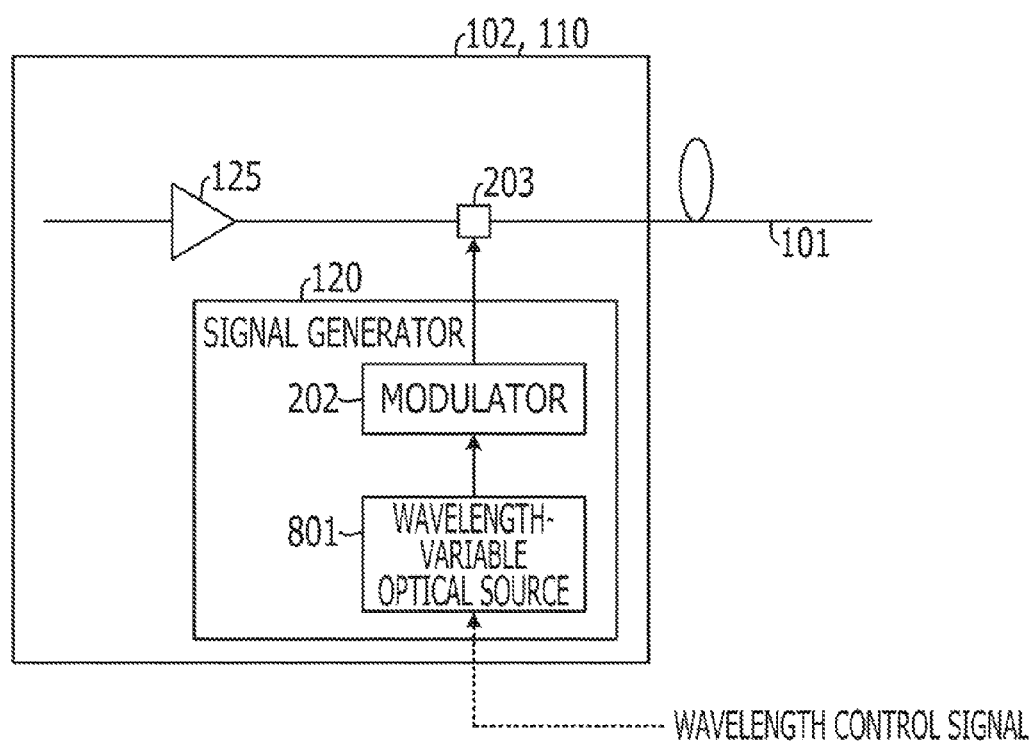
FIG. 8 is a block diagram illustrating one configuration of a signal generator for DGD measurement.

FIG. 8 is a block diagram illustrating one configuration of a signal generator for DGD measurement. A configuration of the signal generator 120 will now be described for the case of using a dedicated signal inside the primary signal band. In this configuration, a wavelength-variable optical source 801 is used as the optical source. Correspondingly, an optical coupler not directed towards particular wavelengths is used for the coupler 203. According to this configuration, a wavelength control signal is output from the NMS 130, and by means of a control for varying the output wavelength of the wavelength-variable optical source 801, DGD values are measured with respect to all wavelengths inside the primary signal band.

(Exemplary Configuration 2 of a Signal Generator for DGD Measurement)

Figure 9:
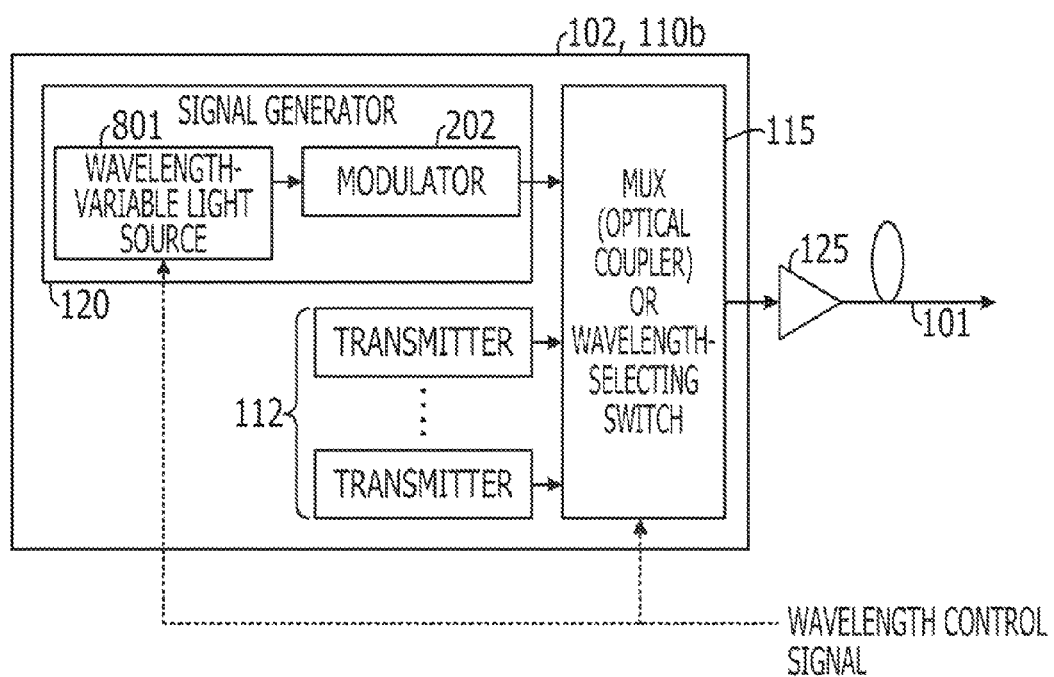
FIG. 9 is a block diagram illustrating another configuration of a signal generator for DGD measurement.

FIG. 9 is a block diagram illustrating another configuration of a signal generator for DGD measurement. In this configuration, a signal generator 120 in parallel with one or more transmitters 112 disposed in the transmitting unit 102 or an add-drop unit 110b. The transmitters 112 are inserted in parallel into slots on the chassis of the transmitting unit 102, and the signal generator 120 is inserted into one or a portion of these slots. The component used for the signal generator 120 may be substantially identical to the transmitters 112 disposed in parallel. Meanwhile, a wavelength-variable optical source 801 is used as the optical source, and the output wavelength is modified by a wavelength control signal from the NMS 130. In the case of this configuration, an optical coupler or a wavelength-selecting switch is used as the multiplexer 115. In the case of using a wavelength-selecting switch, the multiplexer 115 and the wavelength-variable optical source

801 are phase-aligned on the basis of a wavelength control signal output by a control operation of the NMS 130, and the components are controlled such that the output wavelength of the signal generator 120 is output from the wavelength-selecting switch.

(Exemplary Configuration 1 of a Monitor for DGD Measurement)

Figure 10:
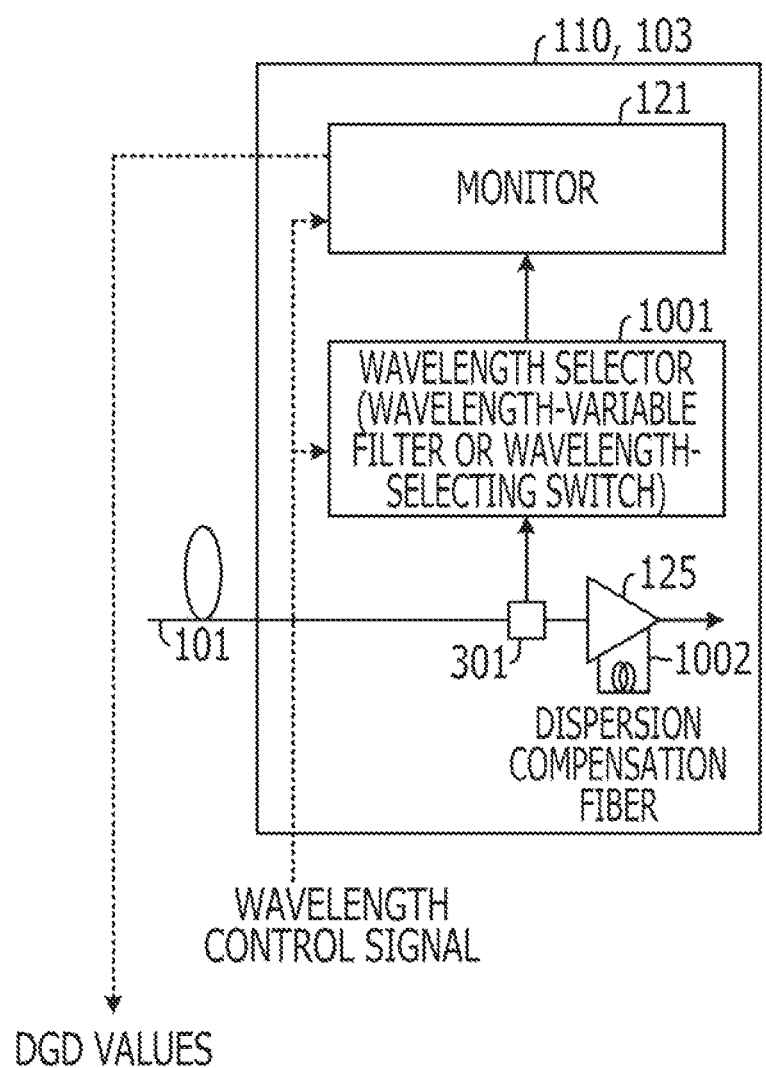
FIG. 10 is a block diagram illustrating one configuration of a monitor for DGD measurement.

FIG. 10 is a block diagram illustrating one configuration of a monitor for DGD measurement. The following describes the configuration of a monitor 121 that monitors the DGD by extracting an optical signal generated by a signal generator from a wavelength-multiplexed primary signal. In this configuration, a splitter 301 is used to extract the optical signal from the primary signal, and then output the optical signal to a wavelength selector 1001. The component used for the wavelength selector 1001 may be a wavelength-variable filter or a wavelength-selecting switch, and configured to extract the wavelengths of an optical signal for measuring the DGD. In the case of this configuration, the splitter 301 may also be a monitor port provided in advance in a relay unit 110*a*, an add-drop unit 110*b*, or the receiving unit 103. As illustrated in FIG. 10, a dispersion compensation fiber 1002 that compensates for wavelength dispersion is provided in the relay unit 110*a*. However, if the dispersion compensation fiber 1002 is disposed downstream to the splitter 301, then the influence of the dispersion compensation fiber 1002 on the DGD values will not be felt at the monitor 121 of the relay unit 110*a*.

The wavelength-variable filter or wavelength-selecting switch used for the wavelength selector 1001 is variably controlled by a wavelength control signal output from the NMS 130 so as to match the wavelength used for DGD measurement. Also, in the case of a configuration using a local oscillator 401 as described earlier at the signal generator 120 (see FIG. 4), the monitor 121 performs a variable control to additionally phase-align the wavelength of the local oscillator 401 with the wavelength used for DGD measurement. In contrast, if a local oscillator 401 is used but the effects of input light on wavelengths other than the desired wavelength may be ignored, then the wavelength selector 100 may be removed, and wavelength selection may be skipped. According to this configuration, it becomes possible to monitor polarization mode dispersion without affecting the primary signal, and even on spans with no primary signal.

(Exemplary Configuration 2 of a Monitor for DGD Measurement)

Figure 11:
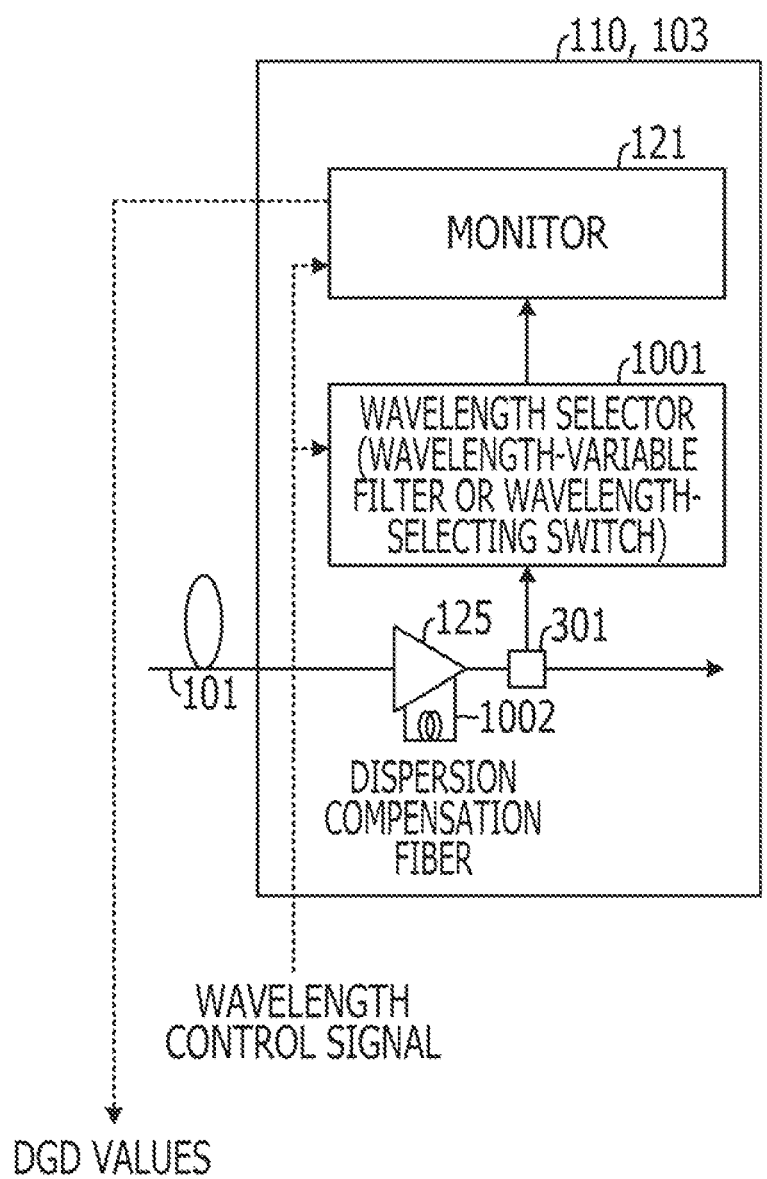
FIG. 11 is a block diagram illustrating another configuration of a monitor for DGD measurement.

FIG. 11 is a block diagram illustrating another configuration of a monitor for DGD measurement. The configuration in FIG. 11 differs from the configuration in FIG. 10 in the position where the optical signal is extracted from the primary signal by the splitter 301. As illustrated in FIG. 11, when the splitter 301 is disposed downstream to the dispersion compensation fiber 1002, DGD values may be measured not only for the transmission line 101, but also including DGD effects due to the dispersion compensation fiber 1002.

(Exemplary Configuration 3 of a Monitor for DGD Measurement)

Figure 12:
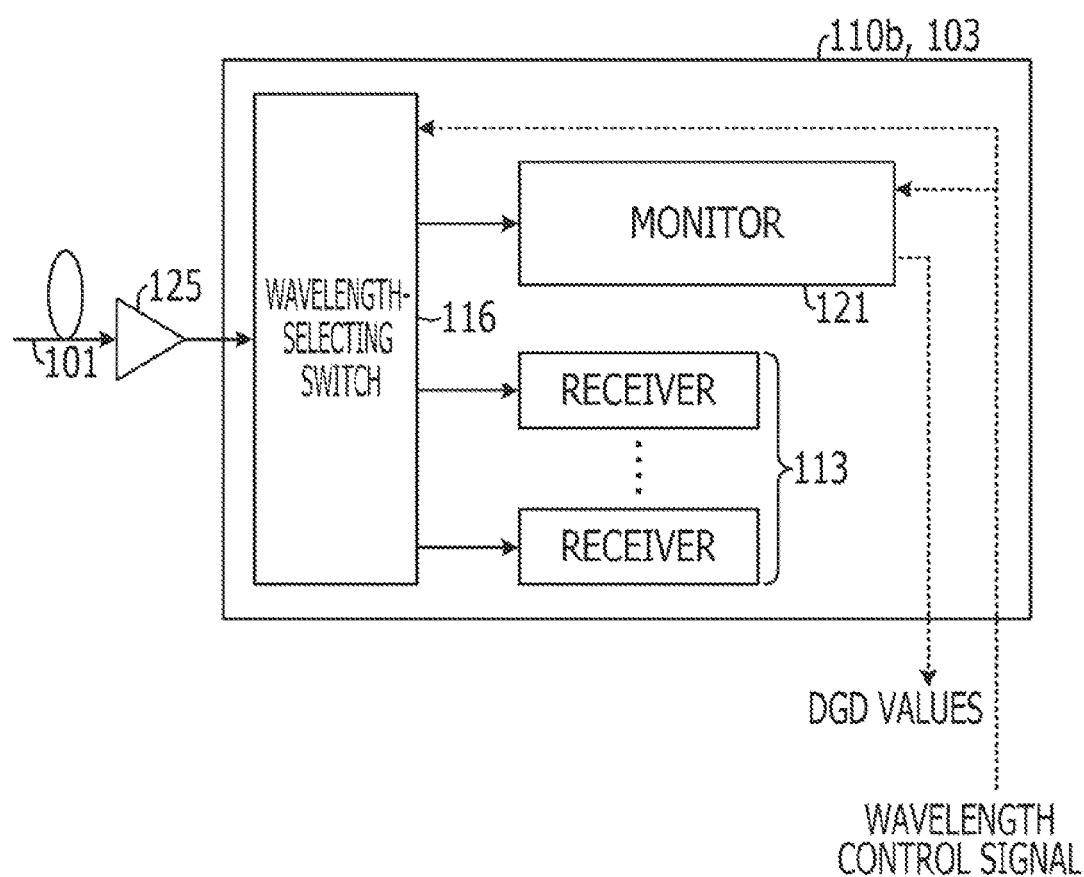
FIG. 12 is a block diagram illustrating another configuration of a monitor for DGD measurement.

FIG. 12 is a block diagram illustrating another configuration of a monitor for DGD measurement. In this configuration, a monitor 121 is disposed in parallel with one or more receivers 113 disposed in an add-drop unit 110*b* or the receiving unit 103. The component used for the monitor 121 may be substantially identical to the receivers 113 disposed in parallel. By means of a wavelength control signal from the NMS 130, a local oscillator in a wavelength-selecting switch 116 or the monitor 121 controls the selected wavelength to match to the wavelength used for DGD measurement.

(Exemplary Configuration 1 of a System for DGD Measurement)

Figure 13:
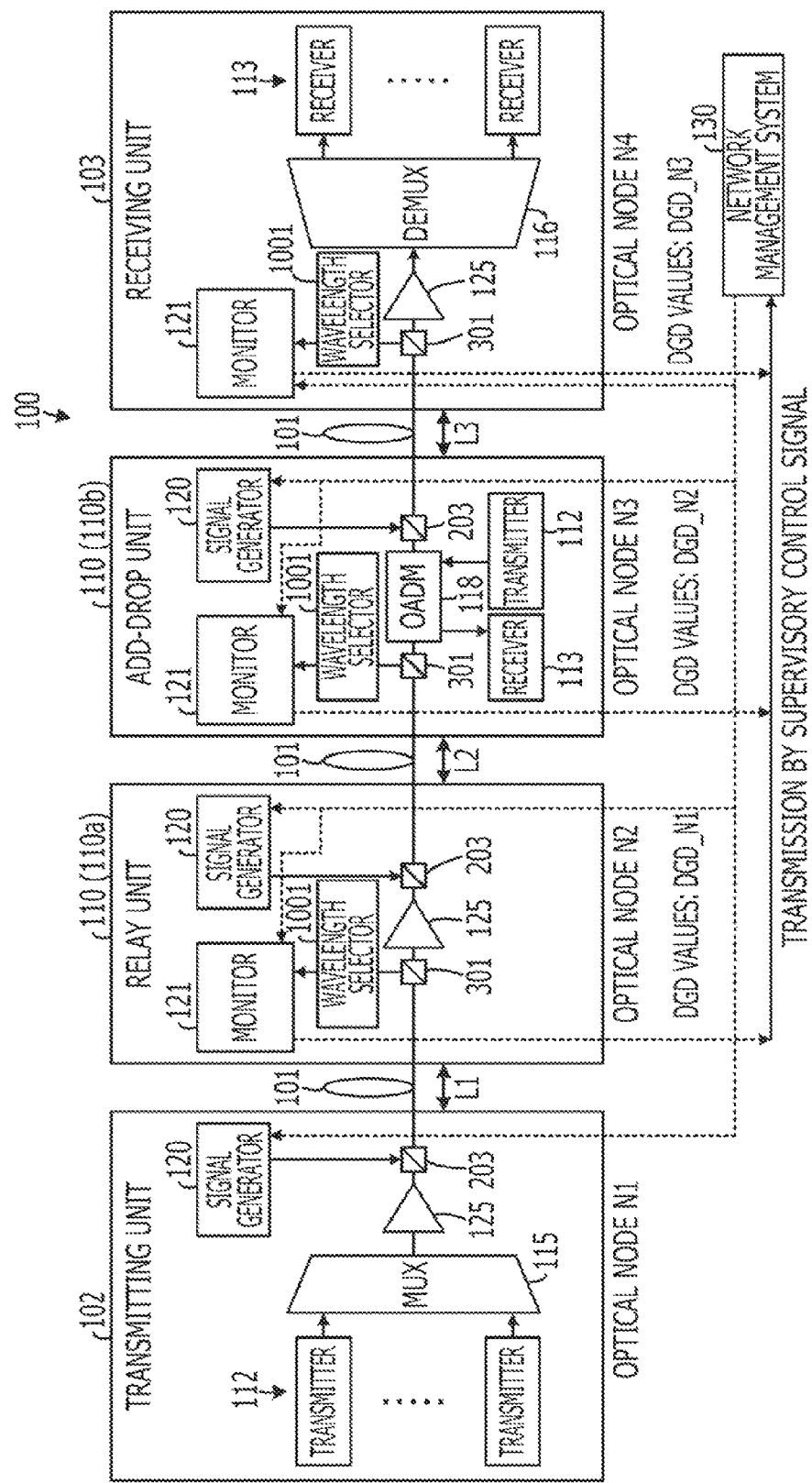
FIG. 13 is a block diagram illustrating an exemplary overall configuration of a system for DGD measurement.

FIG. 13 is a block diagram illustrating an exemplary overall configuration of a system for DGD measurement. Per-span DGD values are measured using the configuration of the signal generator 120 illustrated in FIG. 8 and the monitor 121 illustrated in FIG. 11. According to such a configuration, the modulated signal used by the modulator 202 of the signal generator 120 may be used for DGD measurement. For this reason, components with slow modulation speeds, low optical outputs, or wide spectral lines may be used, thus making it possible to realize the signal generator 120 at low cost.

Also, in this configuration, signal generators 120 and monitors 121 disposed in respective optical nodes (N1 to N4) may be used to individually measure DGD values on specific spans L1, L2, and L3 in the primary signal band. For example, a measurement signal output from the signal generator 120 provided in the transmitting unit 102 (i.e., the optical node N1) passes through the optical node N2 via the optical amplifier 125 inside the optical node N1, and reaches the optical nodes N3 and N4. In this case, the DGD values for the span L1 may be measured by the monitor 121 of the optical node N2. Furthermore, by means of a measurement signal from the signal generator 120 of the optical node N2, the DGD values for the span L2 may be measured by the monitor 121 of the optical node N3. Similarly, by means of a measurement signal from the signal generator 120 of the optical node N3, the DGD values for the span L3 may be measured by the monitor 121 of the optical node N4.

Figure 14:
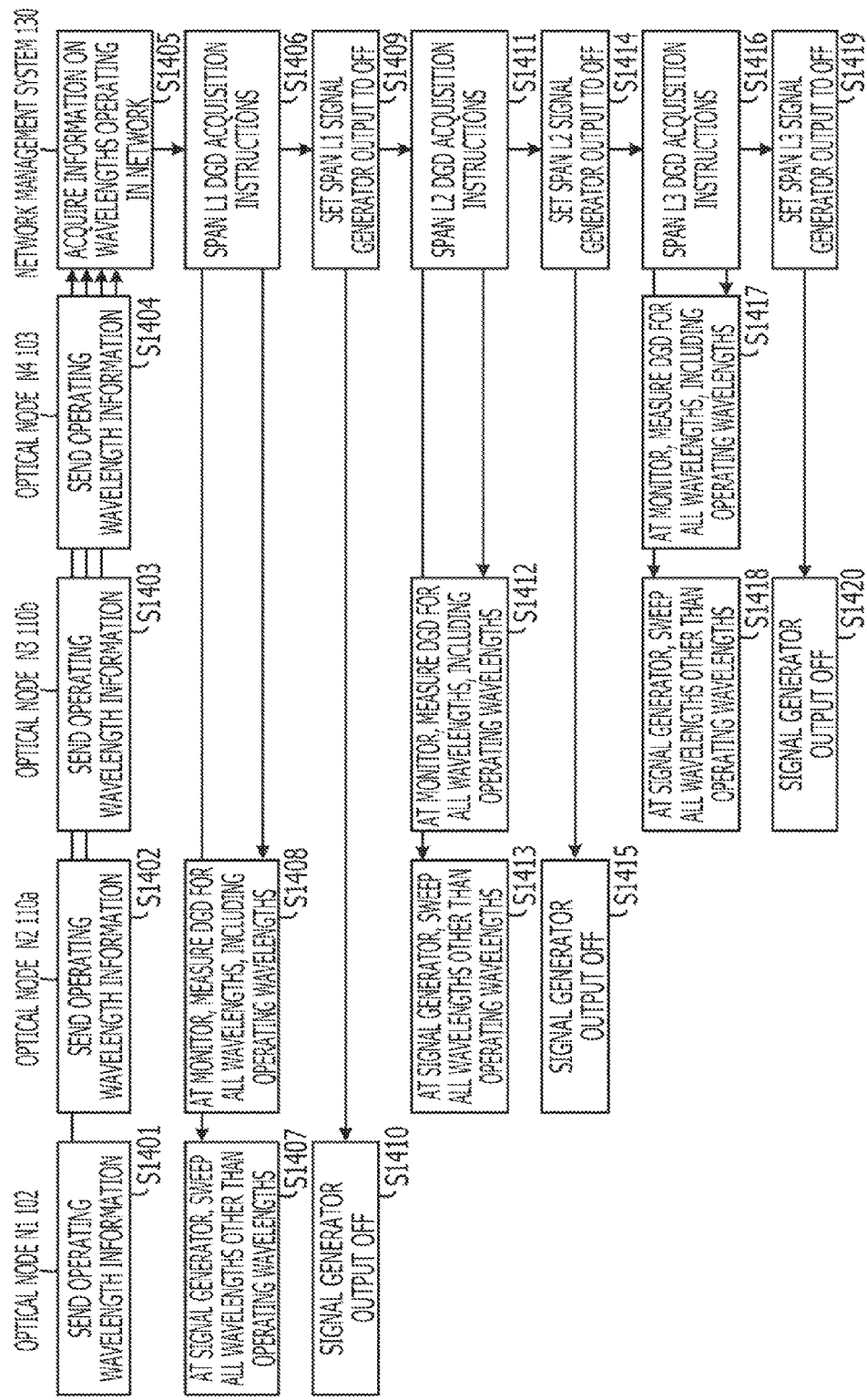
FIG. 14 illustrates the flow of a per-span DGD value acquisition process in the exemplary system configuration 1.

FIG. 14 illustrates the flow of a per-span DGD value acquisition process in the exemplary system configuration 1. During system operation, the optical nodes N1 to N4 each send operating wavelength information to the NMS 130 (operations S1401 to S1404), and the NMS 130 acquires information regarding the operating wavelengths on the network from each of the optical nodes N1 to N4 (operation S1405). Subsequently, when acquiring DGD values, acquisition instructions for each transmission span are issued.

First, DGD acquisition instructions for the span L1 are issued (operation S1406). By means of these acquisition instructions, the optical node N1 (102) provided with the signal generator 120 on the span L1 uses the signal generator 120 to output a measurement signal with the signal generator 120 that sweeps all wavelengths other than the operating wavelengths (operation S1407). Meanwhile, in the optical node N2 (110*a*) provided with the monitor 121 that measures measurement signals on the span L1, the monitor 121 is used to measure the DGD values on all wavelengths, including the operating wavelengths (operation S1408). Subsequently, the NMS 130 sets the output of the signal generator 120 on the span L1 to OFF (operation S1409), thereby switching off output from the signal generator 120 in the corresponding optical node N1 (102) (operation S1410). In so doing, the DGD values on the span L1 may be measured. Thereafter, the respective DGD values for the spans L2 and L3 may be measured by processes similar to that of the span L1.

As described above, by means of a control by the NMS 130, the optical signal output from the signal generator 120 provided in the optical node N1 (102) is cut off once the span L1 has been measured. In so doing, the measurement of the span L1 does not influence the measurement of the span L2. By using such a configuration, it becomes possible to easily and inexpensively measure the DGD along pre-operational transmission spans or for unused signal wavelengths by sweeping the wavelengths of a wavelength-variable filter or LD over the entire range of existing signals.

(Exemplary Configuration 2 of a System for DGD Measurement)

Figure 15:
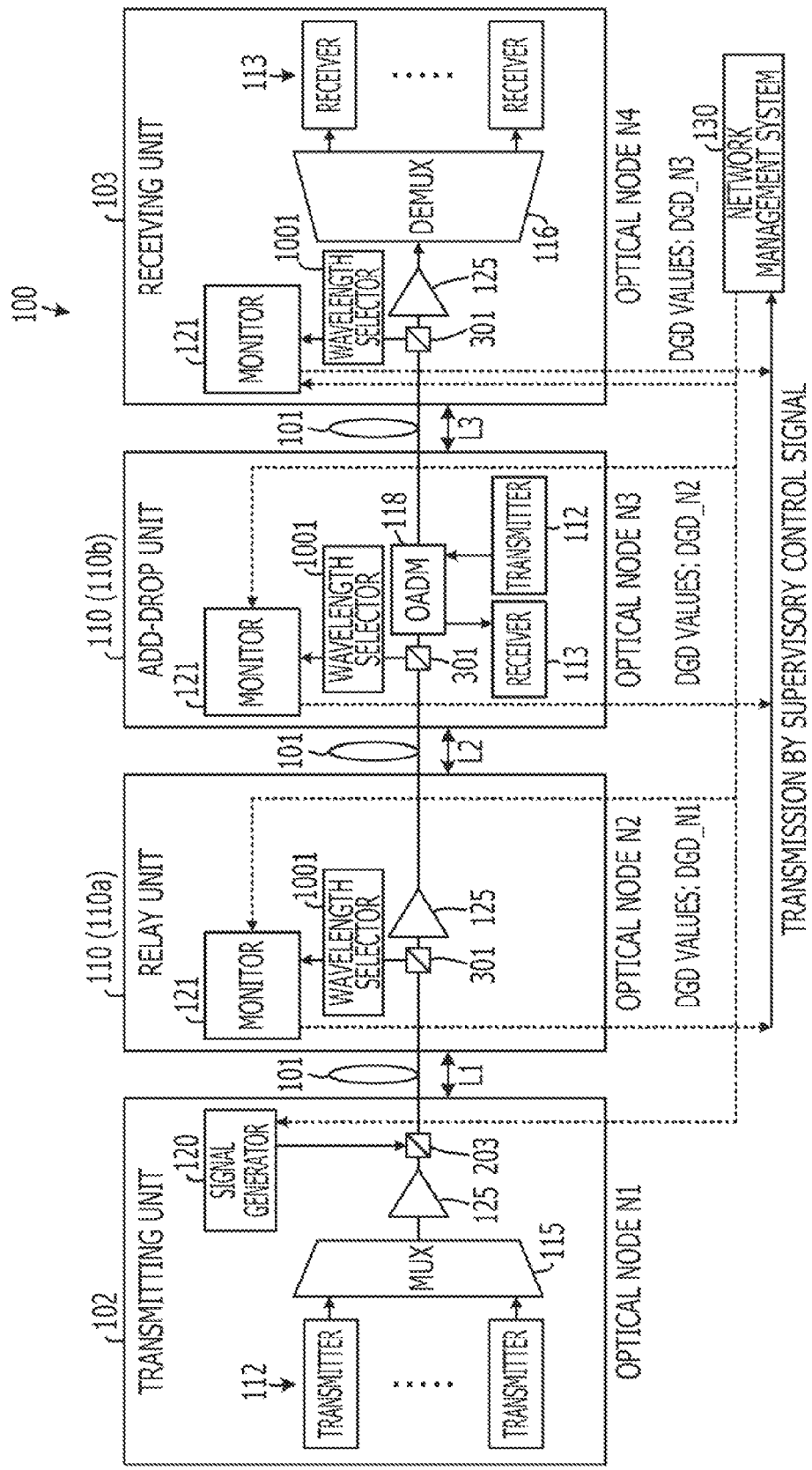
FIG. 15 is a block diagram illustrating another exemplary overall configuration of a system for DGD measurement.

FIG. 15 is a block diagram illustrating another exemplary overall configuration of a system for DGD measurement. In this configuration, measurements are taken not only for the DGD of the transmission line 101, but also for the DGD of the optical components within the optical nodes. As illustrated in FIG. 15, the system is configured such that a signal generator 120 is disposed only in the optical node N1 (i.e., the transmitting unit 102) at the start terminal of the transmission line 101. As a result, it is unnecessary to dispose a signal generator 120 in the other optical nodes N2, N3, and N4 along the transmission line 101. According to this configuration, the total DGD values from the transmitting unit 102 to each of the optical nodes N2 to N4 may be monitored, with the DGD values of each monitor 121 being transmitted to the NMS 130.

Additionally, the NMS 130 may obtain the mean PMD for each span by acquiring a mean PMD at each span from the DGD value information monitored by the monitor 121 at each of the optical nodes N2 to N4, and then computing the mean PMD value for each span on the basis of that information. For example, the distribution of DGD values for the span L1 (DGD_N1) obtained from the optical node N2 as well as the distribution of DGD values for the spans L1 and L2 (DGD_N2) obtained from the optical node N3 may be used to compute respective mean PMD values (meanPMD_L1 and meanPMD_L1,L2). Subsequently, the mean PMD value for the span L2 may be obtained by computation using the following formula:

$$\text{mean}PMD\_L2=\sqrt{\{(\text{mean}PMD\_L1,L2)^2-(\text{mean}PMD\_L1)^2\}}.$$

(Exemplary Configuration 3 of a System for DGD Measurement)

Figure 16:
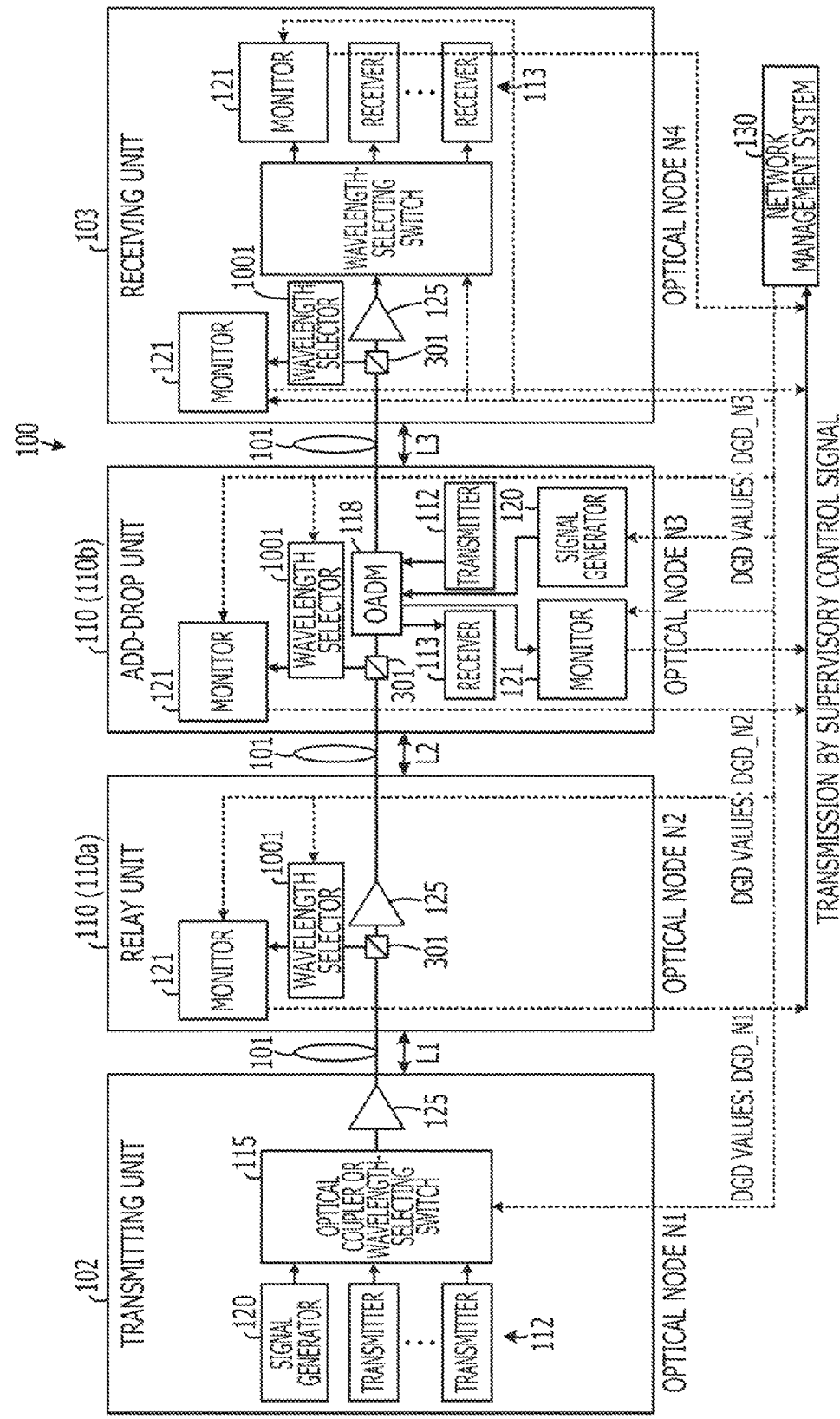
FIG. 16 is a block diagram illustrating another exemplary overall configuration of a system for DGD measurement.

FIG. 16 is a block diagram illustrating another exemplary overall configuration of a system for DGD measurement. In this exemplary configuration, the configuration illustrated in FIG. 9 is used for the signal generator 120, and the configuration illustrated in FIG. 10 or FIG. 11 is used for the monitor 121. Since the modulated signal of the signal generator 120 is used for DGD measurement, components with slow modulation speeds, low optical outputs, or wide spectral lines may be used, thus making it possible to realize the signal generator 120 at low cost.

Furthermore, in this configuration, the signal generator 120 is disposed in parallel with the transmitters 112 in the transmitting unit 102 or the add-drop unit 110b. The signal generator 120 selects a wavelength other than the operating wavelengths being used at the transmitting unit 102, and then uses the selected wavelength for the measurement signal. In the monitor 121, only the wavelength of the measurement signal used for DGD measurement is selected and monitored by the wavelength selector 1001. For example, in the transmitting unit 102 or the add-drop unit 110b of a pre-operational system, the wavelength of the measurement signal may be swept across the entire band. In so doing, DGD values may be acquired for all wavelengths upon which the network operates. The monitor values obtained by the monitor 121 at each of the optical nodes N2 to N4 may then be computed using techniques similar to those described for the exemplary configuration 2.

(Exemplary Configuration 4 of a System for DGD Measurement)

Figure 17:
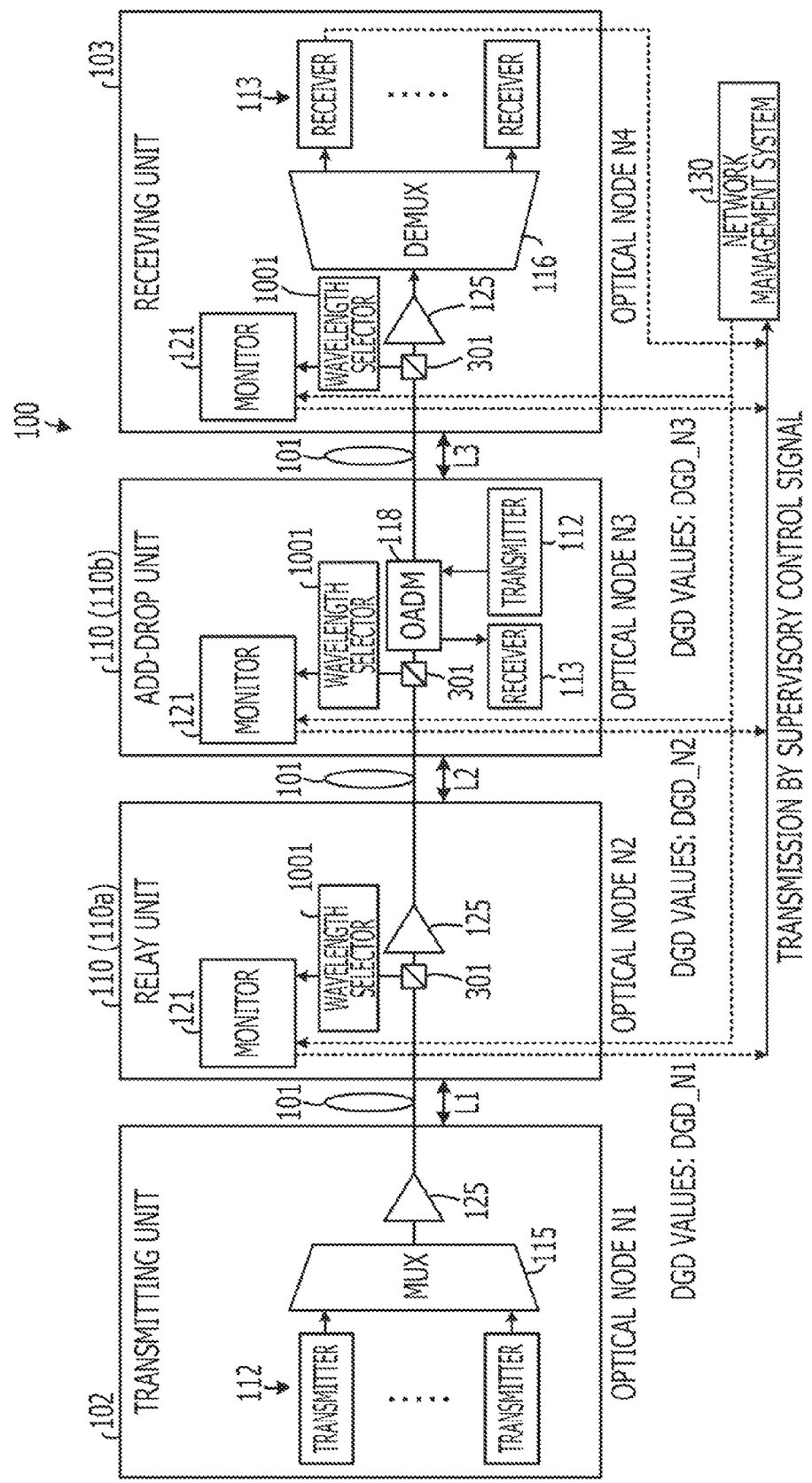
FIG. 17 is a block diagram illustrating another exemplary overall configuration of a system for DGD measurement.
Figure 18:
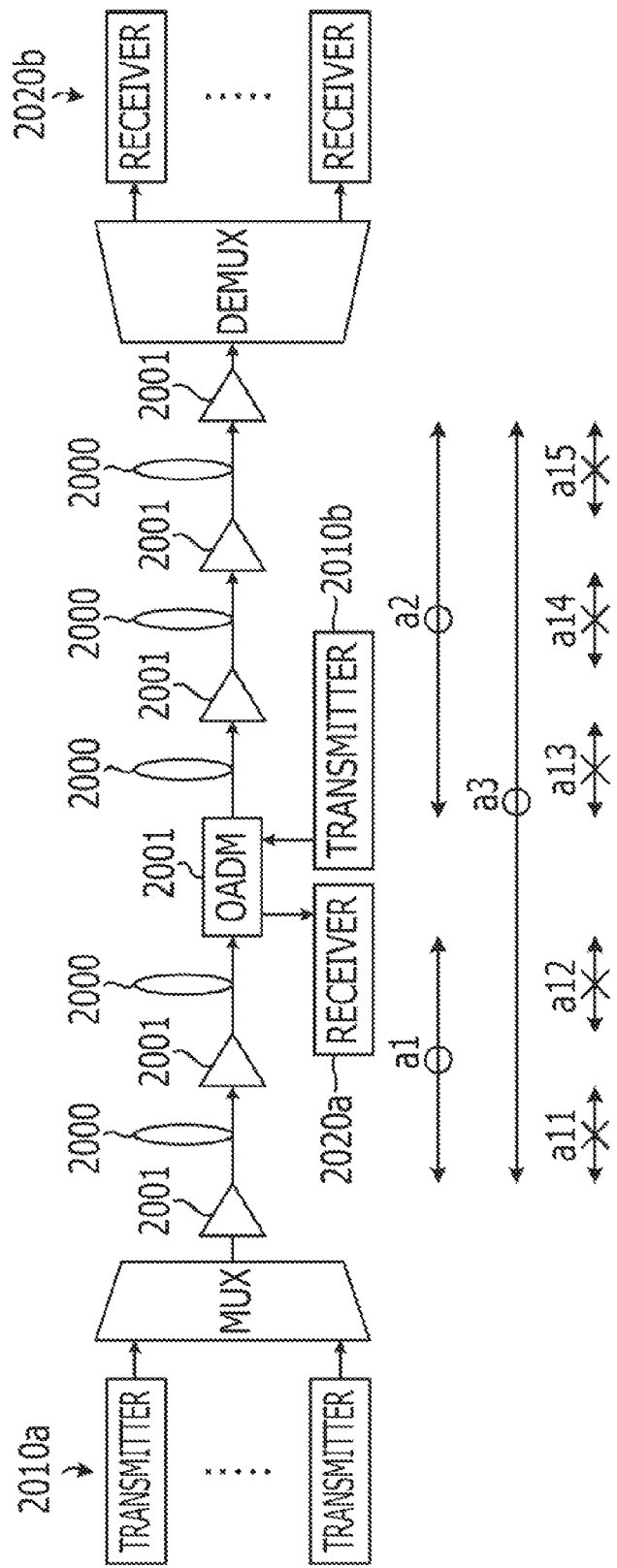
FIG. 18 is a network layout diagram illustrating the configuration of PMD measurement using a receiver of the related art.

FIG. 17 is a block diagram illustrating another exemplary overall configuration of a system for DGD measurement. In this exemplary configuration, per-span DGD values are measured by using the operating wavelengths of the transmitting unit 102 and the add-drop unit 110b as-is, and by using the configuration illustrated in FIG. 10 or FIG. 11 for the monitor 121. With this configuration, the DGD values for the operating wavelengths may be monitored on each of the spans L1 to L3. In this case, the wavelength of the filter in the wavelength selector 1001 and the local oscillator 401 in the monitor 121 are controlled to match the wavelength for which DGD values are to be measured. The obtained DGD values are transmitted to the NMS 130, and may then be acquired as per-span DGD values as described earlier.

In all of the exemplary system configurations described above, each optical node transmits DGD values to the NMS 130, and the per-span DGD values and mean PMD values are computed by the NMS 130. Additionally, each optical node is under central supervisory control by the NMS 130. However, it should be appreciated that the NMS 130 is not limited to performing central supervisory control and computing DGD and other values. Specific optical nodes, such as the optical node N4 at the end terminal, may also be configured to perform supervisory control of each of the preceding optical nodes and also compute DGD and other values.

Also, the network in the above systems is described by way of example as a column (i.e., linear) network having a start terminal and an end terminal. However, the technology disclosed herein may also be configured such that, when viewing a signal path on the network, a signal generator is disposed on a preceding optical node, and a monitor is disposed on a succeeding optical node. Thus, per-span DGD values may be measured and otherwise handled as described earlier, even on networks with a ring network or similar topology.

As described in the foregoing, according to the technology disclosed herein, signal generators and monitors are disposed in optical nodes, thereby allowing the PMD characteristics (i.e., DGD values) of each span of the optical nodes to be measured. More particularly, it becomes possible to measure the DGD without influencing the primary signal used for network operation. Furthermore, mean PMD may be monitored over long periods of time. As a result, it becomes possible to select routes (i.e., signal paths) according to the quality of the PMD characteristics when designing the network or adding transmitter wavelengths, for example. The following note regarding the embodiments described above is also disclosed.

According to the optical node, optical network system, and method for measuring polarization mode dispersion disclosed herein, per-span measurement of PMD characteristics may be easily measured at low cost, and without affecting optical signals in operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the invention have been described in detail, it should be understood that the various changes, substitutions, and alterations could be made hereto without departing from the spirit and scope of the invention.

What is claimed is:

1. An optical node disposed along a transmission line that uses optical fibers, the optical node comprising:
   a signal generator configured to generate a first measurement signal for measuring polarization mode dispersion values, and transmit the first measurement signal to a downstream optical fiber of the transmission line; and a monitor configured to detect a second measurement signal from an upstream optical fiber of the transmission line, and measure polarization mode dispersion values by performing signal processing with respect to the second measurement signal, wherein the first measurement signal generated by the signal generator uses a wavelength of a supervisory control signal for supervising and controlling a primary signal, wherein the monitor includes a divider configured to divide the polarization components of the second measurement signal into mutually orthogonal horizontal and vertical components, one or more optical detectors configured to take the optical signals for the horizontal and vertical components divided by the divider, and opto-electrically convert the optical signals into electrical signals, one or more analog-to-digital converters configured to digitally convert the analog detection values of the one or more optical detectors, a signal processor configured to apply digital signal processing to the digital detection values converted by the one or more analog-to-digital converters, and thereby compute coefficients used to compute the polarization mode dispersion values, a controller configured to compute the polarization mode dispersion values on the basis of the coefficients output by the signal processor, a clock recovery unit configured to recover the timing of the second measurement signal; and an equalizer configured to accept as input the respective phase components of the second measurement signal after passing through the clock recovery unit, and periodically output FIR filter coefficients, wherein a trigger for obtaining polarization mode dispersion values is periodically transmitted with respect to the signal processor, and wherein the controller includes a first storage configured to store the coefficients output from the signal processor on the basis of the transmission of the trigger, and a calculator configured to calculate the polarization mode dispersion values on the basis of the coefficients stored in the first storage.

2. The optical node according to claim 1, further comprising:

a coupler configured to combine the first measurement signal generated by the signal generator with a primary signal on the transmission line.

3. The optical node according to claim 1, further comprising:

a splitter configured to divert the second measurement signal from the transmission line, and output the second measurement signal to the monitor.

4. The optical node according to claim 1, wherein the first measurement signal generated by the signal generator uses a wavelength other than the wavelengths currently in operation within the primary signal wavelength band.

5. The optical node according to claim 1, wherein the monitor includes a divider configured to divide the polarization components of the second measurement signal into mutually orthogonal horizontal and vertical components, a local oscillator configured to output an optical signal on the same wavelength as the second measurement signal, one or more mixers configured to mix the second measurement signal with the optical signal from the local oscillator, and extract phase components therefrom, one or more optical detectors configured to take the phase components of the horizontal components as well as the phase components of the vertical components that were obtained by the one or more mixers, and opto-electrically convert the respective components into electrical signals, one or more analog-to-digital converters configured to digitally convert the analog detection values of the one or more optical detectors, a signal processor configured to apply digital signal processing to the digital detection values converted by the one or more analog-to-digital converters, and thereby compute coefficients used to compute the polarization mode dispersion values, and a controller configured to compute the polarization mode dispersion values on the basis of the coefficients output by the signal processor.

6. The optical node according to claim 1, wherein the controller further includes a second storage configured to store a history of the polarization mode dispersion values, and wherein the variation of polarization mode dispersion values over time is computed.

7. The optical node according to claim 1, wherein the controller transmits the polarization mode dispersion values to a network management system.

8. The optical node according to claim 1, further comprising:

a wavelength selector configured to selectively select a wavelength of the second measurement signal, and output the selected wavelength to the monitor.

9. The optical node according to claim 1, wherein the signal generator includes an optical source configured to freely modify the wavelength of the first measurement signal on the basis of a control signal, and a coupler configured to combine the first measurement signal with a primary signal, and wherein the first measurement signal is modified to wavelengths other than the wavelengths of the primary signal currently in operation.

10. The optical node according to claim 9, wherein the monitor monitors polarization mode dispersion values on a measurement wavelength by causing a local oscillator provided in the monitor to produce an optical signal having a wavelength matched to the wavelength of the second measurement signal.

11. The optical node according to claim 10, wherein the signal generator sweeps the first measurement signal to be generated across wavelengths other than the wavelengths of the primary signal currently in operation, and the monitor monitors wavelengths that are phase-aligned with the wavelength of the second measurement signal.

12. An optical network system, comprising:

a transmission line using optical fibers;

a first optical node including a signal generator configured to generate a first measurement signal for measuring polarization mode dispersion values, and transmit the first measurement signal to a downstream optical fiber of the transmission line; and a second optical node including a monitor configured to detect the first measurement signal, transmitted from the first optical node, from an upstream optical fiber of the transmission line, and measure polarization mode dispersion values by performing signal processing with respect to the first measurement signal, wherein the first measurement signal generated by the signal generator uses a wavelength of a supervisory control signal for supervising and controlling a primary signal, wherein the monitor includes
- a divider configured to divide the polarization components of a second measurement signal into mutually orthogonal horizontal and vertical components,
- one or more optical detectors configured to take the optical signals for the horizontal and vertical components divided by the divider, and opto-electrically convert the optical signals into electrical signals,
- one or more analog-to-digital converters configured to digitally convert the analog detection values of the one or more optical detectors,
- a signal processor configured to apply digital signal processing to the digital detection values converted by the one or more analog-to-digital converters, and thereby compute coefficients used to compute the polarization mode dispersion values,
- a controller configured to compute the polarization mode dispersion values on the basis of the coefficients output by the signal processor,
- a clock recovery unit configured to recover the timing of the second measurement signal; and
- an equalizer configured to accept as input the respective phase components of the second measurement signal after passing through the clock recovery unit, and periodically output FIR filter coefficients, wherein
- a trigger for obtaining polarization mode dispersion values is periodically transmitted with respect to the signal processor, and wherein the controller includes
  - a first storage configured to store the coefficients output from the signal processor on the basis of the transmission of the trigger, and
- a calculator configured to calculate the polarization mode dispersion values on the basis of the coefficients stored in the first storage.

13. The optical network system according to claim 12, further comprising:
a supervisory unit configured to collect the polarization mode dispersion values measured by the monitor; wherein
the supervisory unit uses arithmetic operations to compute, from the polarization mode dispersion values measured by the first optical node and the second optical node, polarization mode dispersion values for the segment of the transmission line between the signal generator and the monitor.

14. The optical network system according to claim 13, wherein
by disposing the signal generator and the monitor in each optical node on the transmission line, the polarization mode dispersion values are computed for individual spans of the transmission line at respective optical nodes provided with the monitor.

15. The optical network system according to claim 14, further comprising:
a network management system configured to collect per-span polarization mode dispersion values computed at the respective optical nodes.

16. A method for measuring polarization mode dispersion in an optical network system having optical nodes along a transmission line using optical fibers, the method comprising:
generating a first measurement signal for measuring polarization mode dispersion values, and transmitting the first measurement signal to a downstream optical fiber of the transmission line from a first optical node;
detecting a second measurement signal from an upstream optical fiber of the transmission line at a second optical node; and
measuring polarization mode dispersion values by performing signal processing with respect to the second measurement signal,
wherein the first measurement signal generated by the generating uses the wavelength of a supervisory control signal for supervising and controlling a primary signal, wherein
the detecting
divides the polarization components of the second measurement signal into mutually orthogonal horizontal and vertical components,
one or more optical detectors taking the optical signals for the horizontal and vertical components divided by the dividing, and opto-electrically converting the optical signals into electrical signals,
one or more analog-to-digital converters digitally converting the analog detection values of the one or more optical detectors,
applying digital signal processing to the digital detection values converted by the one or more analog-to-digital converters, and thereby computing coefficients used to compute the polarization mode dispersion values,
computing the polarization mode dispersion values on the basis of the coefficients output by the signal processor,
recovering the timing of the second measurement signal; and
accepting as input the respective phase components of the second measurement signal after passing through the clock recovery unit, and periodically outputting FIR filter coefficients, wherein
a trigger for obtaining polarization mode dispersion values is periodically transmitted with respect to the signal processor, and wherein
storing the coefficients output from the signal processor on the basis of the transmission of the trigger, and
calculating the polarization mode dispersion values based on the coefficients.

* * * * *